(12) United States Patent
Ezure et al.

(10) Patent No.: US 11,838,678 B2
(45) Date of Patent: Dec. 5, 2023

(54) RADIATION IMAGING APPARATUS AND RADIATION IMAGING SYSTEM

(71) Applicant: CANON KABUSHIKI KAISHA, Tokyo (JP)

(72) Inventors: Ryo Ezure, Tokyo (JP); Shimpei Tezuka, Tochigi (JP); Hidetoshi Tsuzuki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 85 days.

(21) Appl. No.: 17/648,593

(22) Filed: Jan. 21, 2022

(65) Prior Publication Data

US 2022/0247942 A1 Aug. 4, 2022

(30) Foreign Application Priority Data

Feb. 4, 2021 (JP) ................................. 2021-016886

(51) Int. Cl.
  *A61B 6/00* (2006.01)
  *H04N 5/321* (2006.01)
  *G01T 1/08* (2006.01)

(52) U.S. Cl.
  CPC .............. *H04N 5/321* (2013.01); *G01T 1/08* (2013.01)

(58) Field of Classification Search
  CPC . G01T 1/08; H04N 5/321; H04N 5/32; H04N 25/63; A61B 6/4266; A61B 6/542; A61B 6/545
  See application file for complete search history.

(56) References Cited

U.S. PATENT DOCUMENTS

| | | | |
|---|---|---|---|
| 9,395,450 B2 | 7/2016 | Tezuka | |
| 10,129,493 B2 * | 11/2018 | Ryu | ..................... H04N 25/626 |
| 10,498,975 B2 | 12/2019 | Tezuka et al. | |
| 11,079,341 B2 | 8/2021 | Tezuka | |
| 11,153,511 B2 | 10/2021 | Tezuka et al. | |
| 2013/0187954 A1 | 7/2013 | Saito et al. | |
| 2015/0320372 A1 | 11/2015 | Sato et al. | |

FOREIGN PATENT DOCUMENTS

JP  2020-89714 A  6/2020

OTHER PUBLICATIONS

U.S. Appl. No. 17/649,433, Satoshi Kamei, filed Jan. 31, 2022.

* cited by examiner

Primary Examiner — Jurie Yun
(74) Attorney, Agent, or Firm — VENABLE LLP

(57) ABSTRACT

A radiation imaging apparatus comprising an imaging region where conversion elements used for an imaging operation of obtaining a radiation image corresponding to incident radiation are arranged, detecting portions in each of which a detecting element used to detect a radiation dose entering the imaging region is arranged, and a controller is provided. The controller is configured to perform, before the imaging operation, an offset readout operation of reading out offset signals of the detecting elements from the detecting portions, detect, in the imaging operation, the radiation dose entering the imaging region by using signals output from the detecting elements during irradiation with radiation and the offset signals, and be capable of changing, during a period of the offset readout operation, an order of reading out the offset signals from the detecting portions.

18 Claims, 6 Drawing Sheets

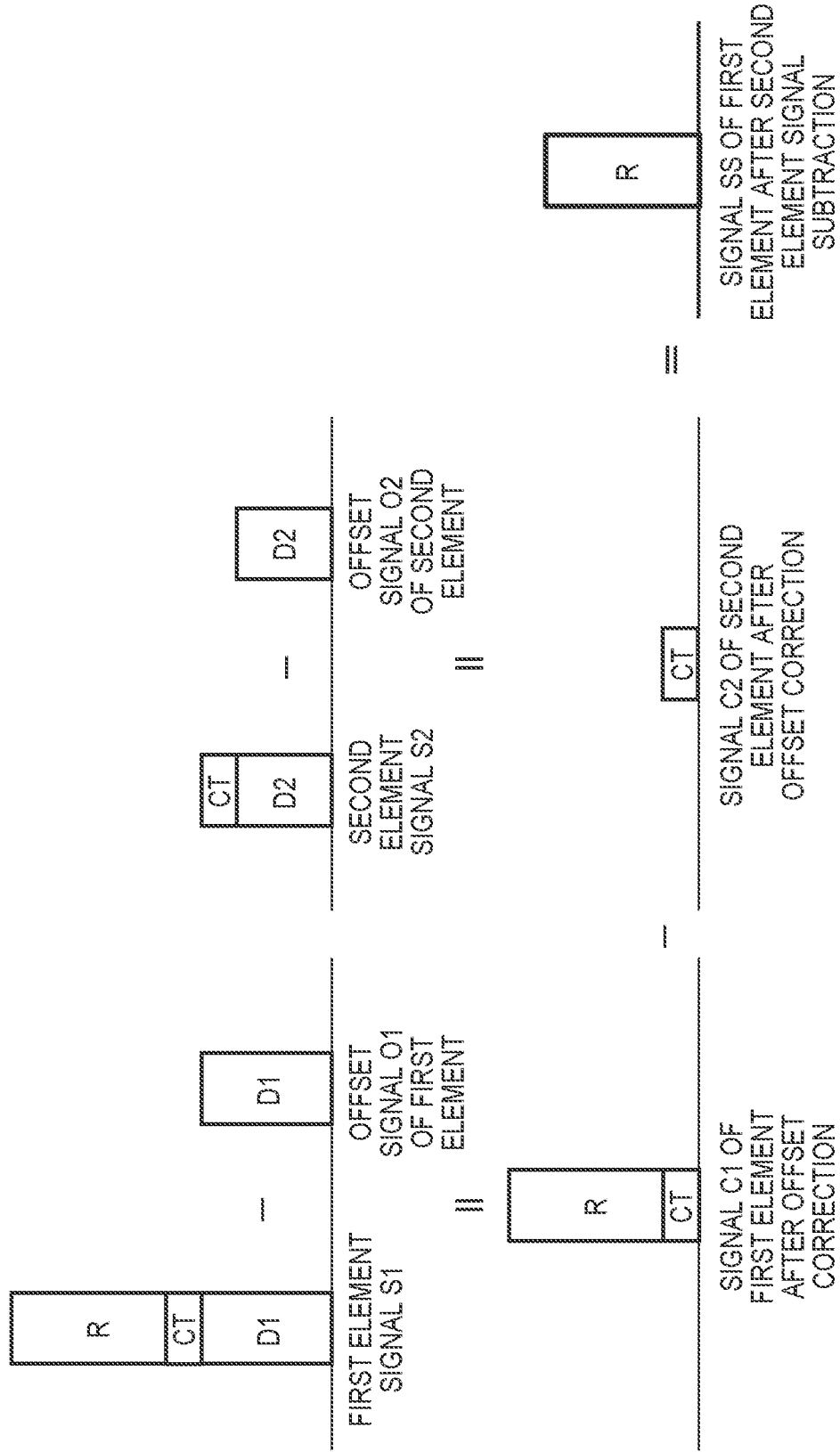

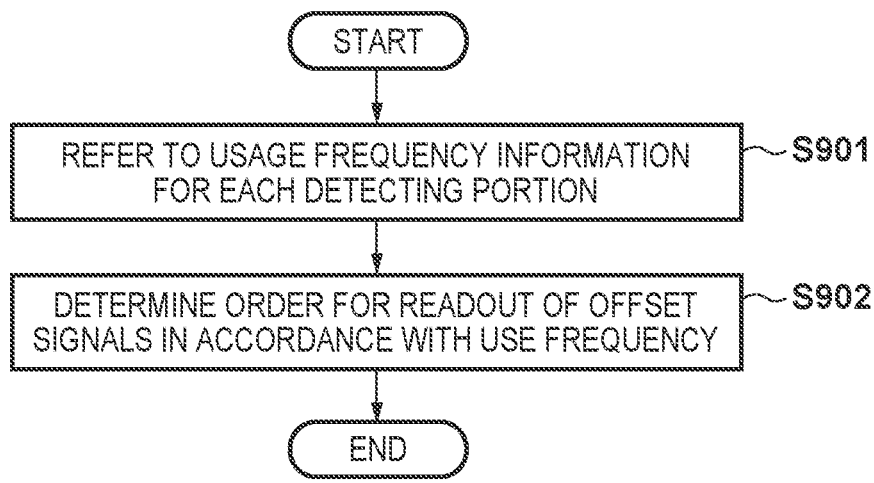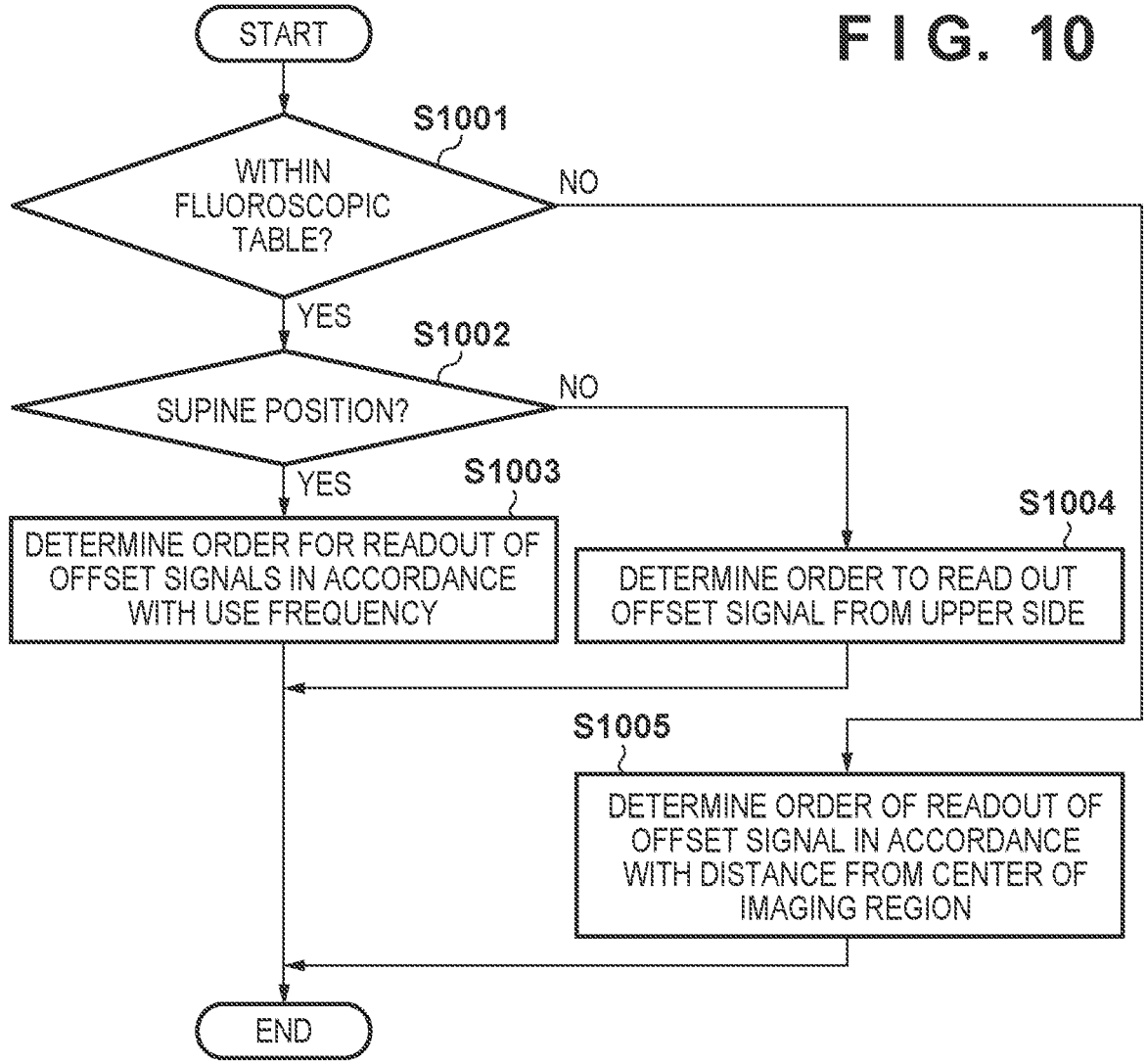

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

In medical image diagnosis and nondestructive inspection, a radiation imaging apparatus using an FPD (Flat Panel Detector) made of a semiconductor material is widely used. Such a radiation imaging apparatus is known to monitor the radiation entering the radiation imaging apparatus. By detecting a radiation dose in real time, it is possible to grasp the integrated dose of radiation entering during irradiation with radiation and perform AEC (Automatic Exposure Control). Japanese Patent Laid-Open No. 2020-089714 describes that in order to detect the radiation dose more accurately, the offset amount of the detecting pixel used for detection of the radiation dose is obtained in advance, and the signal output from the detecting pixel during irradiation with radiation is corrected in accordance with the offset amount obtained in advance.

SUMMARY OF THE INVENTION

In order to support a plurality of imaging procedures, the detecting pixel for detecting the radiation dose may be arranged in each of a plurality of regions, so that it is necessary to obtain the offset amount from the detecting pixel arranged in each of the regions. In addition, since the offset amount changes due to an environmental change such as the temperature of the radiation imaging apparatus, it is necessary to appropriately obtain the offset amount of the detecting pixel in each region again and update the offset amount data. The offset amount of the detecting pixel is obtained while irradiation with radiation is not performed. In a case in which radiation images are captured at short intervals or the like, depending on the updating order of the offset amount data of the detecting pixel in each region, irradiation with radiation may be started before the offset amount data of the detecting pixel used for AEC is updated.

Each of some embodiments of the present invention provides a technique advantageous in improving the accuracy of AEC in a radiation imaging apparatus.

According to some embodiment, a radiation imaging apparatus comprising: an imaging region where a plurality of conversion elements used for an imaging operation of obtaining a radiation image corresponding to incident radiation are arranged; a plurality of detecting portions in each of which a detecting element used to detect a radiation dose entering the imaging region is arranged; and a controller, wherein the controller is configured to perform, before the imaging operation, an offset readout operation of reading out offset signals of the detecting elements from the plurality of detecting portions in a state in which irradiation with radiation is not performed, detect, in the imaging operation, the radiation dose entering the imaging region by using signals output from the detecting elements during irradiation with radiation and the offset signals, and be capable of changing, during a period of the offset readout operation, an order of reading out the offset signals from the plurality of detecting portions, is provided.

According to some other embodiment, a radiation imaging apparatus comprising: an imaging region where a plurality of conversion elements used for an imaging operation of obtaining a radiation image corresponding to incident radiation are arranged; a plurality of detecting portions in each of which a detecting element used to detect a radiation dose entering the imaging region is arranged; and a controller, wherein the controller is configured to perform, before the imaging operation, an offset readout operation of reading out offset signals of the detecting elements from the plurality of detecting portions in a state in which irradiation with radiation is not performed, and detect, in the imaging operation, the radiation dose entering the imaging region by using signals output from the detecting elements during irradiation with radiation and the offset signals, and the offset readout operation is performed in an order according to distances between the plurality of detecting portions and a center of the imaging region, is provided.

Further features of the present invention will become apparent from the following description of exemplary embodiments (with reference to the attached drawings).

BRIEF DESCRIPTION OF THE DRAWINGS

FIG. 8 is a view showing an example of correcting the offset signal in the radiation imaging apparatus according to the embodiment;

FIG. 9 is a flowchart illustrating an example of determining the offset signal readout order of the radiation imaging apparatus according to the embodiment;

FIG. 10 is a flowchart illustrating another example of determining the offset signal readout order of the radiation imaging apparatus according to the embodiment.

DESCRIPTION OF THE EMBODIMENTS

Figure 1:
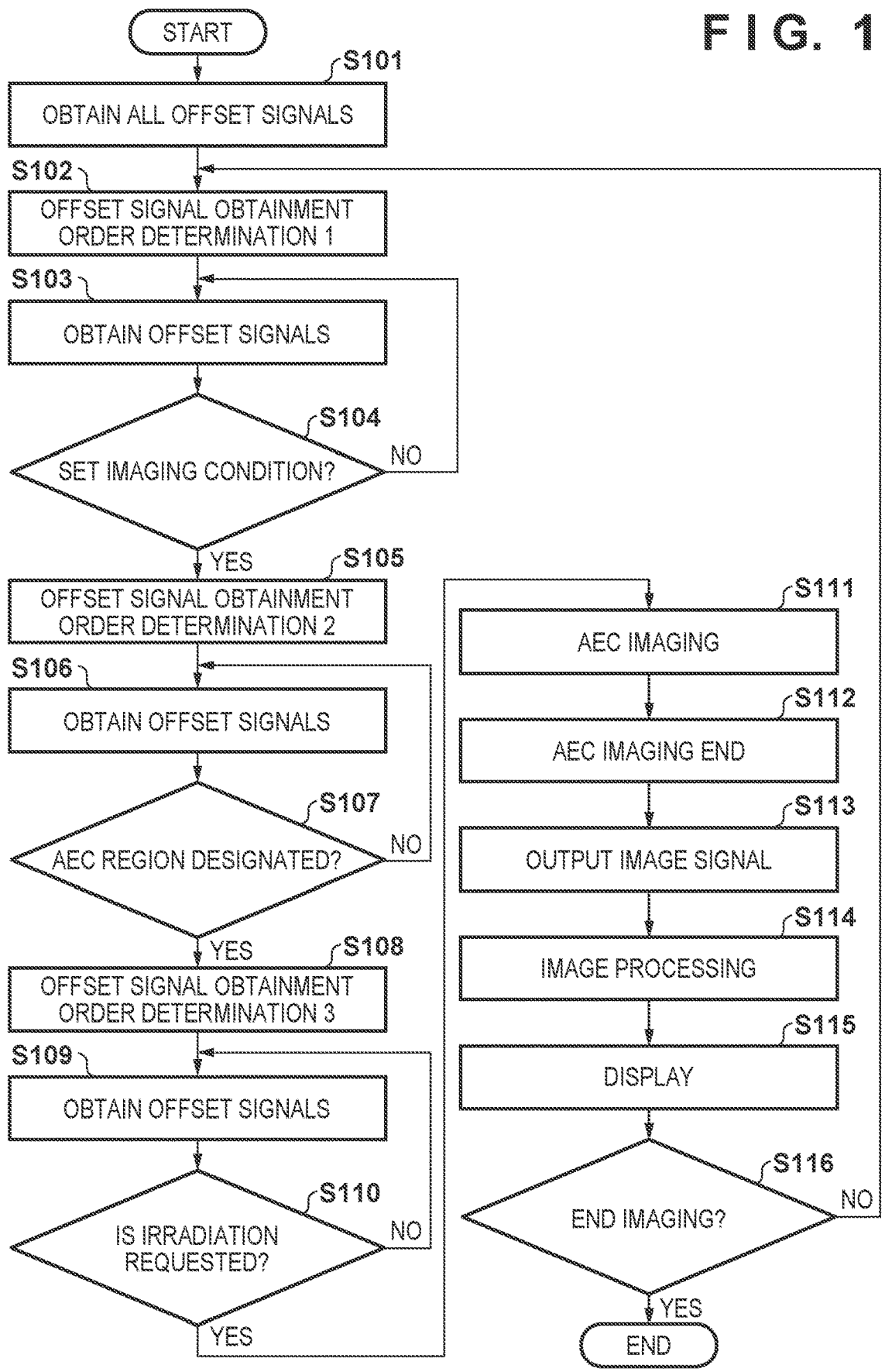
FIG. 1 is a flowchart illustrating the procedure of an imaging operation of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation in the present invention can include α-rays, β-rays, γ-rays, and the like which are beams generated by particles (including photons) emitted by radiation decay, as well as beams having the similar or higher energy, for example, X-rays, particle beams, cosmic rays, and the like.

Figure 2:
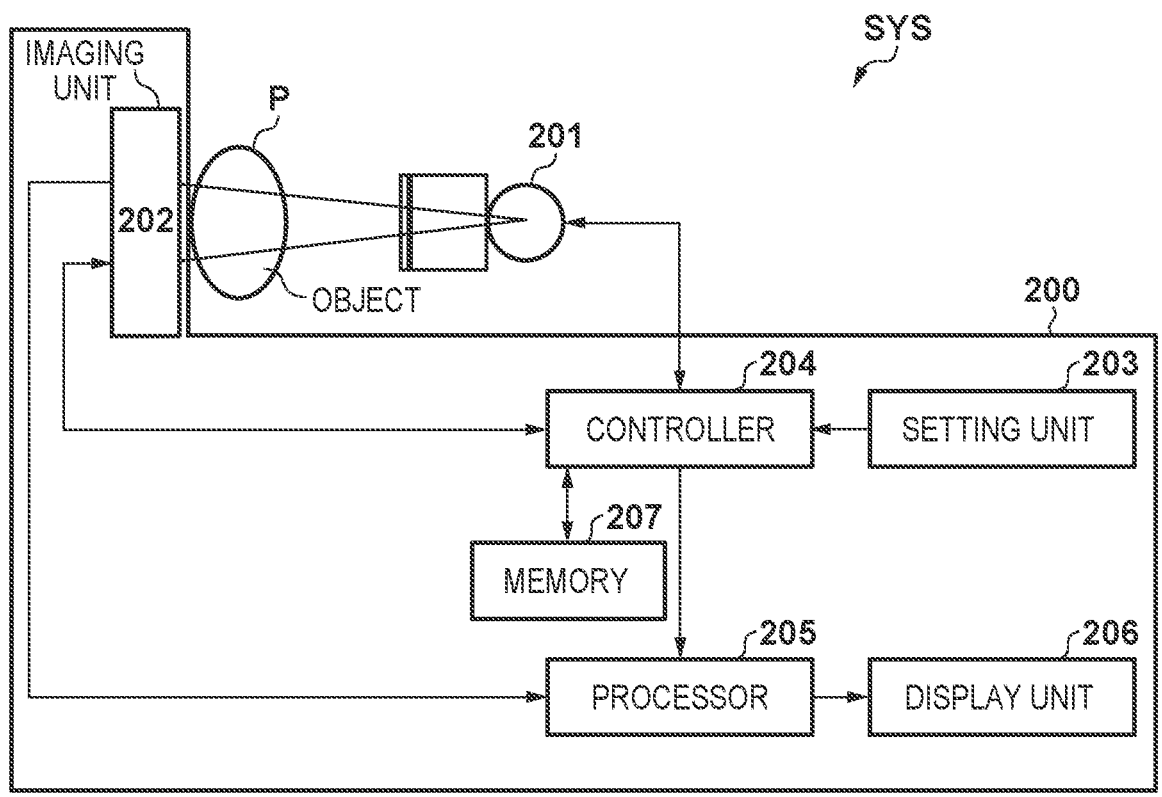
FIG. 2 is a view showing a configuration example of a radiation imaging system using the radiation imaging apparatus according to the embodiment.

With reference to FIGS. 1 to 11, the arrangement and operation of a radiation imaging apparatus according to this embodiment will be described. FIG. 1 is a flowchart illustrating the procedure of the imaging operation of a radiation imaging apparatus 200 according to this embodiment. FIG. 2 is a view showing a configuration example of a radiation imaging system SYS using the radiation imaging apparatus 200 according to this embodiment. Before describing the procedure of imaging using the radiation imaging apparatus 200, the arrangement of the radiation imaging apparatus 200 will be described. The radiation imaging apparatus 200 can be used for, for example, medical purposes.

As shown in FIG. 2, the radiation imaging system SYS includes the radiation imaging apparatus 200, and a radiation generation apparatus 201 that irradiates the radiation imaging apparatus 200 with radiation. The radiation generation apparatus 201 irradiates an object P with radiation. The radiation generation apparatus 201 can be configured to include a radiation generator (tube bulb) for generating radiation, a collimator for defining the beam spread angle of the radiation generated by the radiation generator, and a radiation dose measuring instrument attached to the collimator.

As shown in FIG. 2, the radiation imaging apparatus 200 can include an imaging unit 202, a setting unit 203, a controller 204, a processor 205, and a display unit 206. The imaging unit 202 includes an imaging region where a plurality of conversion elements used for an imaging operation of obtaining a radiation image corresponding to incident radiation are arranged, and a plurality of detecting portions in each of which a detecting element used to detect the radiation dose entering the imaging region is arranged. The imaging unit 202 can be, for example, an FPD (Flat Panel Detector) which includes a plurality of conversion elements distributed two-dimensionally and generates a radiation image data by detecting the two-dimensional distribution of the radiation reaching the imaging unit 202. The imaging unit 202 transmits, to the processor 205, the radiation image data generated by the plurality of conversion elements in an imaging operation. Further, the imaging unit 202 transmits, to the controller 204, information of the radiation dose detected by the detecting portion.

Figure 3:
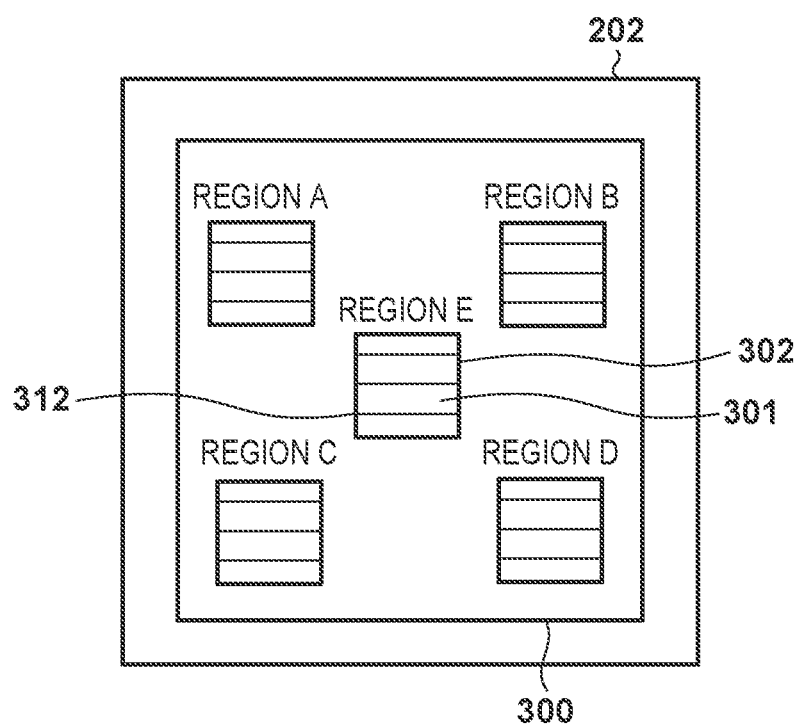
FIG. 3 is a view showing the arrangement of an imaging region of the radiation imaging apparatus according to the embodiment.

FIG. 3 is a view showing an arrangement example of the imaging unit 202 of the radiation imaging apparatus 200 according to this embodiment. An imaging region 300 is arranged in the imaging unit 202, and a plurality of conversion elements 301 for obtaining a radiation image are arranged in the imaging region 300. The conversion element 301 can also be referred to as a pixel. Further, a plurality of detecting portions 302 are arranged in the imaging unit 202, and a detecting element 312 for detecting the radiation dose entering the imaging region is arranged in each detecting portion 302. The detecting portion 302 may be arranged alongside the conversion element 301 in the imaging region 300 as shown in FIG. 2, may be arranged in the outer edge of the imaging region 300, or may be arranged outside the imaging region 300. In this embodiment, the detecting portion 302 are set in each of five regions including a region A, a region B, a region C, a region D, and a region E. Three rows of the detecting elements 312 are arranged in the detecting portion 302 in each of the regions A to E. The radiation dose entering the imaging region 300 is detected based on one or a combination of two or more of the plurality of detecting portions 302. In this embodiment, the detecting portions 302 are arranged in the five regions A to E and three rows of the detecting elements 312 are arranged in each detecting portion 302. However, the present invention is not limited to this. For example, the detecting portions 302 may be set in four or less regions, or may be arranged in six or more regions. Further, one detecting element 312 may be arranged in each detecting portion 302, or a plurality of detecting elements 312 may be arranged in each detecting portion 302. The arrangement may be appropriately changed in accordance with the specifications required for the radiation imaging apparatus 200.

The setting unit 203 includes a component used by an operator (for example, a radiation technician) to input an imaging condition such as the imaging part, the target dose, the irradiation condition to be set in the radiation generation apparatus 201 to irradiate the radiation imaging apparatus 200 with radiation, and information specifying the imaging procedure. The irradiation condition can include a tube voltage kV, a tube current mA, and the conditions for the collimator, a filter, and the like to be set in the radiation generation apparatus 201. The setting unit 203 can include, for example, a keyboard or a touch panel used by the operator to input the imaging condition. In the configuration shown in FIG. 2, the radiation imaging apparatus 200 includes the setting unit 203, but the present invention is not limited to this. The setting unit 203 may be arranged outside the radiation imaging apparatus 200. If the imaging condition is input to the setting unit 203, the setting unit 203 transmits, to the controller 204, the information of the imaging condition input by the operator.

The controller 204 controls respective components of the radiation imaging apparatus 200. The controller 204 performs, before an imaging operation which is started by the operator pressing an exposure switch or the like to request irradiation with radiation, an offset readout operation of reading out the offset signals of the detecting elements 312 from the plurality of detecting portions 302 in a state in which irradiation with radiation is not performed. At this time, the offset signals may be read out from the conversion elements 301 arranged in the imaging region 300. Further, in the imaging operation, the controller 204 detects the radiation dose entering the imaging region 300 by using signals output from the detecting element 312 during irradiation with radiation and the offset signals obtained before the imaging operation. That is, the controller 204 performs correction processing on the signal obtained from the detecting element 312 arranged in the detecting portion 302 during irradiation with radiation by using the offset signal obtained before the imaging operation. With this processing, the accuracy of detection of the radiation dose improves.

The processor 205 performs processing such as gradation processing or noise reduction processing on the radiation image data obtained by the plurality of conversion elements 301 arranged in the imaging region 300 of the imaging unit 202 in the imaging operation. For example, the processor 205 may perform correction processing on the radiation image data by using the offset signal of the conversion element 301 obtained before the imaging operation. The processor 205 transmits the radiation image data having undergone processing to the display unit 206. The display unit 206 displays the radiation image on a monitor or the like in accordance with the data output from the processor 205. In the configuration shown in FIG. 2, the radiation imaging apparatus 200 includes the processor 205 and the display unit 206, but the present invention is not limited to this. The processor 205 and the display unit 206 may be arranged outside the radiation imaging apparatus 200.

Next, the procedure of the imaging operation of the radiation imaging apparatus 200 according to this embodiment will be described with reference to FIG. 1. When the radiation imaging apparatus 200 is powered on, in step S101, the controller 204 obtains the offset signals of the detecting elements 312 from all the five detecting portions 302 arranged in the imaging unit 202. The controller 204 obtains and stores the offset signals of the detecting elements 312 of the detecting portion 302 in each of the regions A to E. As shown in FIG. 2, a memory 207 for storing the data of the obtained offset signal may be arranged in the radiation imaging apparatus 200. The memory 207 may be arranged in the controller 204. If storing of the offset signals output from the detecting elements 312 of all the detecting portions 302 is complete, the controller 204 transitions from step S101 to step S102.

Figure 4:
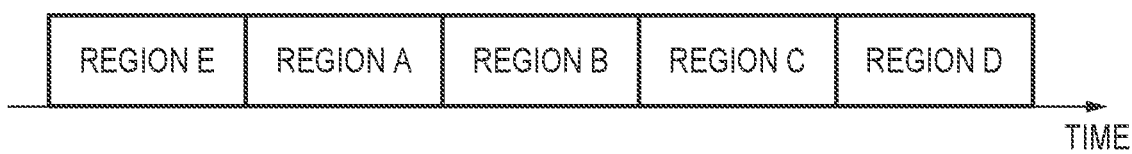
FIG. 4 is a view showing an example of the offset signal readout order of the radiation imaging apparatus according to the embodiment.

The period from step S102 to step S110 is the period of the offset readout operation of reading out, before the imaging operation, the offset signals of the detecting elements 312 from the plurality of detecting portions 302 in a state in which irradiation with radiation is not performed. In step S102, the controller 204 determines the order of reading out the offset signals from the plurality of detecting portions 302 (regions A to E). The controller 204 may control the imaging unit 202 to start to read out the offset signals in a predetermined order in accordance with the start of the offset readout operation. For example, the controller 204 may read out the offset signals from the detecting elements 312 of the respective detecting portions 302 in the order according to the distances between the plurality of detecting portions 302 and the center of the imaging region 300. For example, as shown in FIG. 4, the controller 204 may determine the order such that the offset signal is read out from the region closer to the center of the imaging region 300 among the five detecting portions 302 (regions A to region E) arranged in the imaging unit 202. Alternatively, the controller 204 may determine the order such that the offset signal is read out from the region far from the center of the imaging region 300.

If the order of obtaining the offset signals is determined in step S102, the controller 204 transitions to step S103 and controls the imaging unit 202 to obtain the offset signals in the determined order. Under the control of the controller 204, the imaging unit 202 causes the detecting elements 312 of the respective detecting portions 302 to output the offset signals in the order determined in step S102. The controller 204 stores, in the memory 207, the data of the offset signal read out from the detecting element 312 of the detecting portion 302. At this time, if there is the offset signal data obtained in advance from the detecting element 312 of the same detecting portion 302, the controller 204 overwrites the new offset signal data with it.

If readout of the offset signals in step S103 is started, the process transitions to step S104, and the controller 204 checks whether the operator sets the imaging condition using the setting unit 203. In this embodiment, as has been described above, the imaging condition can include the imaging part, the target dose of radiation to be applied to the object P, the irradiation condition to be set in the radiation generation apparatus 201 such as the tube voltage kV and the tube current mA, and the information specifying the imaging procedure. If the imaging condition is input and set by the operator, the setting unit 203 transmits the information of the imaging condition set by the operator to the controller 204. If the information of the imaging condition is received, the controller 204 transitions to step S105. If the imaging condition is not set, the process returns to step S103, and the controller 204 performs processing of obtaining the offset signals in the order determined in step S102. At this time, for example, if determination in step S104 is performed and the process returns to step S103 upon reading out the offset signal from the detecting element 312 of the detecting portion 302 in the region B, the controller 204 may restart readout of the offset signal from the detecting element 312 of the detecting portion 302 in the region C. Alternatively, the controller 204 may perform readout of the offset signals in step S103 and determination in step S104 in parallel.

If the imaging condition is set in step S104 and the process transitions to step S105, the controller 204 performs control of changing the order of reading out the offset signals in accordance with the set imaging condition. First, in step S105, the controller 204 refers to the imaging condition set in step S104, and determines a new order of reading out the offset signals from the plurality of detecting portions 302 arranged in the imaging unit 202.

Figure 5:
FIG. 5 is a view showing another example of the offset signal readout order of the radiation imaging apparatus according to the embodiment.

For example, if the information indicating "imaging of the lung" serving as the information specifying the imaging procedure is set as the imaging condition, the controller 204 determines the order so as to read out the offset signals from the detecting portion 302 located in the upper portion of the imaging region 300. In this case, for example, the offset signals can be read out in the order of the upper portion, the center, and the lower portion as shown in FIG. 5. Alternatively, for example, if the information indicating "imaging of the stomach" is set, the controller 204 determines the order so as to read out the offset signals from the detecting portion 302 located in the center of the imaging region 300 as shown in FIG. 4.

If the order of obtaining the offset signals is determined in step S105, the controller 204 transitions to step S106 and controls the imaging unit 202 to obtain the offset signals in the determined order. Under the control of the controller 204, the imaging unit 202 causes the detecting elements 312 of the respective detecting portions 302 to output the offset signals in the order determined in step S105. The controller 204 stores, in the memory 207, the data of the offset signal read out from the detecting element 312 of the detecting portion 302. At this time, if there is the offset signal data obtained in advance from the detecting element 312 of the same detecting portion 302, the controller 204 overwrites the new offset signal data with it.

If readout of the offset signals in step S106 is started, the process transitions to step S107, and the controller 204 checks whether the operator designates, using the setting unit 203, the detecting portion 302 used for detection of the radiation dose in the imaging operation among the plurality of detecting portions 302 (regions A to E). If the detecting portion 302 used for detection of the radiation dose is designated, the setting unit 203 transmits the information of the detecting portion 302 designated by the operator to the controller 204. If the information of the detecting portion 302 used for detection of the radiation dose is received, the controller 204 transitions to step S108. If the detecting portion 302 used for detection of the radiation dose is not designated, the process returns to step S106, and the controller 204 continues processing of obtaining the offset signals in the order determined in step S105. At this time, the controller 204 may restart readout of the offset signals from the next detecting portion 302, in the order determined in step S105, of the detecting portion 302 from which the signal was read out before the determination in step S107. Similar to the above-described operations in steps S103 and S104, the controller 204 may perform steps S106 and S107 in parallel.

If the detecting portion 302 used for detection of the radiation dose is designated in step S107 and the process transitions to step S108, the controller 204 determines the order of reading out the offset signals from the designated detecting portion 302 among the plurality of detecting portions 302. At this time, the controller 204 can determine the order so as to obtain the offset signals only from the detecting portion 302 designated by the operator among the plurality of detecting portions 302. For example, if one detecting portion 302 is designated, the controller 204 may determine to continuously read out the offset signals from the one designated detecting portion 302. Alternatively, if two detecting portions are designated, the controller 204 may determine to alternately read out offset signals from the two designated detecting portions 302.

If the order of obtaining the offset signals is determined in step S108, the controller 204 transitions to step S109 and controls the imaging unit 202 to obtain the offset signals in the determined order. Under the control of the controller 204, the imaging unit 202 causes the detecting element 312 of each detecting portion 302 to output the offset signals in the order determined in step S108. The controller 204 stores, in the memory 207, the data of the offset signal read out from the detecting element 312 of the detecting portion 302. At this time, if there is the offset signal data obtained in advance from the detecting element 312 of the same detecting portion 302, the controller 204 overwrites the new offset signal data with it.

Step S110 is performed in parallel with step S109. In step S110, the controller 204 determines whether the operator requests irradiation with radiation. More specifically, if an irradiation request signal requesting irradiation with radiation, which is generated by the operator pressing the exposure switch or the like, is input to the controller 204, the process transitions to step S111. If no irradiation request signal is input, the controller 204 continues processing of obtaining the offset signals in step S109.

If the irradiation request signal is input to the controller 204 in step S110 and the process transitions to step S111, the controller 204 transmits an irradiation instruction signal to the radiation generation apparatus 201. If the irradiation instruction signal is received, the radiation generation apparatus 201 starts irradiation with radiation in accordance with the irradiation instruction signal. Further, the controller 204 causes the conversion elements 301 to start an accumulating operation for obtaining a radiation image, and starts, from the detecting element 312 of the detecting portion 302 designated in step S107, readout of signals for detecting the incident radiation dose. With this, imaging (to be also referred to as AEC (Automatic Exposure Control) imaging) of a radiation image according to AEC is started. The operation from step S111 to step S116 corresponds to the period of the imaging operation of obtaining a radiation image corresponding to incident radiation.

In AEC imaging, under the control of the controller 204, the imaging unit 202 causes the detecting element 312 of the detecting portion 302 designated in step S107 to output a signal. The controller 204 performs offset correction on the signal read out from the detecting element 312 based on the offset signal data output from the detecting element 312 of the same detecting portion 302 and stored in the memory 207. The controller 204 sequentially adds up the signals having undergone the offset correction. If the added signals reach the target dose set in step S104, the controller 204 transmits an irradiation end signal to the radiation generation apparatus 201, and the process transitions to step S112.

In step S112, if the irradiation end signal is received, the radiation generation apparatus 201 stops the irradiation with radiation, and the AEC imaging is terminated. Further, the controller 204 terminates the operation of reading out the signals from the detecting elements 312 of the detection portions 302. If the AEC imaging is terminated, the process transitions to step S113.

In step S113, the controller 204 transmits, to the processor 205, radiation image data obtained by the respective conversion elements 301 arranged in the imaging region 300 of the imaging unit 202. Then, in step S114, the processor 205 performs correction processing such as gradation processing or noise reduction processing on the radiation image data obtained by the conversion elements 301. The radiation image data having undergone the correction processing by the processor 205 is transmitted to the display unit 206. If the radiation image data is received, the display unit 206 converts the received radiation image data into a two-dimensional image and displays it for the operator in step S115. Then, in step S116, if an imaging end signal indicating that there is no succeeding imaging, the controller 204 terminates the sequence of imaging illustrated in FIG. 1. If no imaging end signal is received, the process returns to step S102.

In the procedure illustrated in FIG. 1, an example is illustrated in which the radiation imaging apparatus 200 performs correction processing and display of the radiation image data, but the present invention is not limited to this. For example, in step S113, the controller 204 may output the radiation image data to the outside of the radiation imaging apparatus 200. In this case, processing such as correction and display of the obtained radiation image data may be performed by a processing apparatus and a display apparatus arranged outside the radiation imaging apparatus 200. In this case, processing in steps S114 and S115 may not be performed.

As has been described above, the radiation imaging apparatus 200 according to this embodiment is configured to be capable of changing, during the period of the offset readout operation performed before the imaging operation, the order of reading out the offset signals from the plurality of detecting portions 302 in accordance with the imaging condition in the imaging operation. With this, for example, it becomes possible to update the offset signal data of the detecting elements 312 used to detect the radiation dose while giving priority to the detecting portion 302 used for AEC. Accordingly, it becomes possible to suppress the possibility that irradiation with radiation is started before updating the offset signal data of the detecting element 312 used for AEC. That is, it is possible to correct, with high accuracy, the offset amount of the detecting portion 302 which can change due to an environmental change of the radiation imaging apparatus 200, so that the radiation imaging apparatus 200 capable of performing AEC imaging with high accuracy can be implemented.

Figure 6:
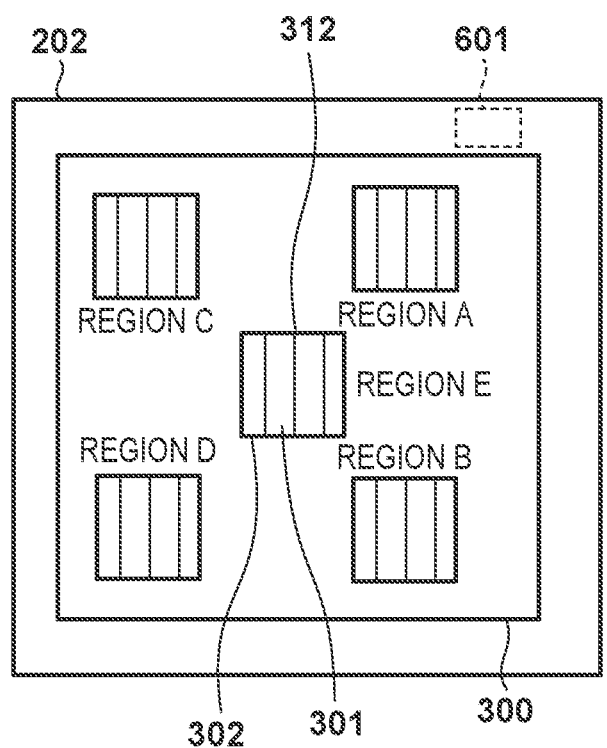
FIG. 6 is a view showing a case in which the orientation of the imaging region with respect to the vertical direction has been changed in the radiation imaging apparatus according to the embodiment.
Figure 7:
FIG. 7 is a view showing still another example of the offset signal readout order of the radiation imaging apparatus according to the embodiment.

In this embodiment, as shown in FIG. 6, the radiation imaging apparatus 200 may further include a detector 601 that detects the orientation (rotation angle) of the imaging region 300 with respect to the vertical direction. The detector 601 can be arranged in the imaging unit 202 where the imaging region 300 is arranged. The controller 204 may change the order of reading out the offset signals in accordance with the orientation detected by the detector. FIG. 6 shows a state in which the imaging region 300 shown in FIG. 3 is rotated by 90° in the clockwise direction. By using the orientation of the imaging region 300 with respect to the vertical direction detected by the detector 601, the controller 204 determines that the detecting portions 302 in the regions A and C are located in the upper portion among the detecting portions 302. For example, with respect to the arrangement of the respective regions of the detecting portions 302 shown in FIG. 3 and the readout order shown in FIG. 4, if the orientation of the imaging region 300 has changed as shown in FIG. 6, the controller 204 changes the order so as to read out the offset signals in the order shown in FIG. 7.

If the imaging unit 202 is configured to be capable of simultaneously obtaining the offset signals of the plurality of detecting portions 302, the controller 204 may read out the offset signals from two or more detecting portions 302 among the plurality of detecting portions 302 in parallel in steps S103, S106, and S109. By reading out the offset signals from the multiple detecting portions 302 in parallel, it is possible to shorten the interval of reading out the offset signals. With this, in the period until the imaging operation according to AEC imaging is started, newer offset signal data can be obtained, so that it is possible to implement highly-accurate AEC imaging by correcting the offset amounts of the detecting portions 302 with high accuracy.

Further, the incident radiation dose may be detected using the signal output from one detecting element 312, or may be detected using the signals output from multiple detecting elements 312. The detecting elements 312 may include a first element and a second element having sensitivities different from each other, and the controller 204 may detect the radiation dose entering the imaging region 300 by using the signals output from the first element and the second element.

A case in which the radiation dose is detected using the elements having sensitivities different from each other will be described with reference to FIG. 8. First, the controller 204 obtains an offset signal O1 from the first element among the detecting elements 312 and an offset signal O2 from the second element having the lower sensitivity to radiation than the first element (steps S101, S106, and S109). As shown in FIG. 8, a dark component D1 generated regardless of irradiation with radiation exits in the offset signal O1 of the first element. Further, as shown in FIG. 8, a dark component D2 generated regardless of irradiation with radiation exits in the offset signal O2 of the second element. Here, assume that the second element is, for example, totally shielded so it has no sensitivity to radiation. The controller 204 stores the data of the offset signals O1 and O2 in the memory 207.

Then, if irradiation with radiation is started in step S111, the controller 204 reads out signals S1 and S2 from the first element and the second element, respectively, at a predetermined interval. As shown in FIG. 8, the dark component D1 generated regardless of irradiation with radiation, a crosstalk component CT generated between the first element and the nearby conversion element due to irradiation with radiation, and a signal component R of radiation exist in the readout signal S1 of the first element. Similarly, as shown in FIG. 8, the dark component D2 generated regardless of irradiation with radiation, and the crosstalk component CT generated between the second element and the nearby conversion element due to irradiation with radiation exist in the signal S2 of the second element. Since the second element has no sensitivity to radiation, it does not include the signal component R of radiation. The controller 204 performs offset correction on the signals S1 and S2 of the first element and the second element during the irradiation with radiation by using the data of the offset signals O1 and O2 of the first element and the second element, respectively. With this, the dark components D1 and D2 can be removed from the signals S1 and S2 of the first element and the second element, respectively.

Accordingly, a signal C1 of the first element after the offset correction includes the signal component R generated due to irradiation with radiation and the crosstalk component CT, and a signal C2 of the second element after the offset correction includes the crosstalk component CT. The controller 204 subtracts the signal C2 of the second element after the offset correction from the signal C1 of the first element after the offset correction. With this, a signal SS from which the crosstalk component CT generated in the signal S1 output from the first element has been removed is obtained. The controller 204 sequentially adds up the signals SS. If the added signals SS reach the target dose set in step S104, the controller 204 transmits a radiation irradiation end signal to the radiation generation apparatus 201. Thus, the influence of crosstalk generated between the conversion element and the detecting element upon detecting the incident radiation dose can be corrected, so that the radiation imaging apparatus 200 capable of performing AEC imaging with higher accuracy can be implemented.

If the radiation irradiation request signal is input while obtaining the offset signals in step S109 (YES in step S110), the controller 204 interrupts the processing of step S109. In this case, upon determining the order of reading out the offset signals again in step S102, the controller 204 may determine the order so as to start readout of the offset signals from the detecting portion 302 where the obtainment was interrupted. For example, in the offset readout operation after the imaging operation of interest, the controller 204 may start readout of the offset signals, in the order according to the set imaging condition, from the next detecting portion, in the order (set in step S104) according to the set imaging condition, of the last readout detecting portion among the plurality of detecting portions 302 in the offset readout operation performed before the imaging operation of interest.

Next, a modification of this embodiment will be described. In the radiation imaging apparatus 200, depending on the condition such as the place where the radiation irradiation apparatus 200 is installed, the frequency of use of the detecting portion 302 used for AEC imaging or the like may largely vary among the detecting portions 302. Therefore, the controller 204 may have a function of storing, for each detecting portion 302, the frequency of designation of the detecting portion 302 in step S107 as the detecting portion 302 used for detection of the radiation dose in the imaging operation among the plurality of detecting portions 302. For example, the controller 204 may have a counter function, and store the count value in the memory 207. The controller 204 changes the order of reading out the offset signals, for example, in step S102 in accordance with the frequency of designation of the detecting portion 302 used for detection of the radiation dose. Alternatively, for example, the controller 204 may have a function of storing, for each detecting portion 302, the frequency of designation in step S107 in association with the imaging condition set in step S104. In this case, if the imaging condition is set in step S104, the controller 204 may change the order of reading out the offset signals in step S105 in accordance with the frequency associated with the set imaging condition. With this, it is possible to correct, with high accuracy, the influence of an environmental change in the installation place where the frequency of use largely varies between the detecting portions 302, so that the radiation imaging apparatus 200 capable of performing AEC imaging with high accuracy can be implemented.

The controller 204 counts, for each of the five regions A to E, the information of the detecting portion 302 designated by the operator in step S107. FIG. 9 shows, for example, the operation in step S102. In step S901, the controller 204 refers to the information of the frequency of use of each of the five detecting portions 302 arranged in the imaging unit 202 regarding the use for detection of the radiation dose in AEC imaging. Then, in step S902, the controller 204 determines the order so as to read out the offset signal from the detecting portion 302 which has the highest frequency of use for detection of the radiation dose among the plurality of detecting portions 302. With this control, even if the frequency of use for detection of the radiation dose largely varies between the detecting portions 302, AEC imaging can be performed with high accuracy.

Further, if the controller 204 stores, for each detecting portion 302, the frequency of designation in step S107 in association with the imaging condition set in step S104, the processing in steps S901 and S902 may be performed in step S105. In this case, if the imaging condition is set in step S104, the controller 204 refers to the information of the frequency of use of each of the five detecting portions 302 arranged in the imaging unit 202 regarding the use for detection of the radiation dose under the imaging condition set in step S104 (step S901). Then, the controller 204 determines the order so as to read out the offset signal from the detecting portion 302 which has the highest frequency of use for detection of the radiation dose, the frequency being associated with the set imaging condition, among the plurality of detecting portions 302 (step S902). With this, it becomes possible to read out the offset signals in the order suitable for each imaging condition. As a result, highly-accurate AEC imaging is implemented.

Further, the imaging condition in the imaging operation may include the information of the placement status of the radiation imaging apparatus 200 (imaging unit 202). Examples of the information of the placement status of the radiation imaging apparatus 200 can be information as to whether the radiation imaging apparatus 200 is placed in a fluoroscopic table. If the radiation imaging apparatus 200 is placed in the fluoroscopic table, information of the posture of the fluoroscopic table such as "supine position" or "standing position" may be included as the imaging condition. A case in which the imaging condition includes the information of the placement status of the radiation imaging apparatus 200 will be described with reference to FIG. 10.

FIG. 10 illustrates the processing in step S105. In step S104, the operator sets the information of the placement status of the radiation imaging apparatus 200 as the imaging condition. After the setting unit 203 transmits the input information of the placement status of the radiation imaging apparatus 200 to the controller 204, the process transitions to step S105, and the processing illustrated in FIG. 10 is started. In step S1001, the controller 204 refers to the received information of the placement status of the radiation imaging apparatus 200 to determine whether the radiation imaging apparatus 200 is placed in the fluoroscopic table. If the radiation imaging apparatus 200 is placed in the fluoroscopic table, the process transitions to step S1002. If the radiation imaging apparatus 200 is not placed in the fluoroscopic table, the process transitions to step S1005. In step S1002, the controller 204 refers to the posture of the fluoroscopic table included in the information of the placement status of the radiation imaging apparatus 200. If the posture of the fluoroscopic table is "supine position", the process transitions to step S1003. If the posture of the fluoroscopic table is "standing position" (NO in step S1002), the process transitions to step S1004.

In step S1003, the controller 204 may determine the order of reading out the offset signals in accordance with the above-described frequency of designation in step S107 as the detecting portion 302 used for detection of the radiation dose. For example, if the imaging condition is set in step S104, the controller 204 may read out the offset signals in the order from the detecting portion 302 having the highest frequency associated with the set imaging condition.

In step S1004, the controller 204 determine the order so as to read out the offset signal from the upper detecting portion among the plurality of detecting portions 302 as shown in FIG. 5. This is because if the posture of the fluoroscopic table is "standing position", it is assumed that imaging of the lung field is performed.

If the radiation imaging apparatus 200 is not placed in the fluoroscopic table, imaging can be performed in various statuses. Therefore, in step S1005, the controller 204 determines to read out the offset signals in the order determined in the same step S102 as before the imaging condition is set in step S104. For example, as has been described above, the order is determined so as to read out the offset signal from the detecting portion 302 closer to the center of the imaging region 300.

With the processing shown in steps S1001 to S1005, in accordance with the placement status of the radiation imaging apparatus 200, it becomes possible to obtain the offset signal data while giving priority to the detecting portion 302 which is likely to be used for detection of the radiation dose. Accordingly, in various places of use where the radiation imaging apparatus 200 is placed, the influence of an environmental change or the like can be corrected with high accuracy, so that the radiation imaging apparatus 200 capable of performing AEC imaging with high accuracy can be implemented.

The information of the placement status of the radiation imaging apparatus 200 is not limited to be input by the operator using the setting unit 203. For example, the radiation imaging apparatus 200 may include a sensor for determining whether it is placed in a fluoroscopic table. For example, a sensor for determining whether the radiation imaging apparatus 200 is placed in a fluoroscopic table may be arranged in a portion of the radiation imaging apparatus 200 which will contact the fluoroscopic table. Further, for example, a connector which physically or electrically connects the radiation imaging apparatus 200 and the fluoroscopic table may be arranged, and it may be determined, in accordance with the connection status of the connector, whether the radiation imaging apparatus 200 is placed in the fluoroscopic table. Furthermore, the radiation imaging apparatus 200 may use the detector 601 as shown in FIG. 6 to detect the posture of the fluoroscopic table.

The controller 204 may cyclically change the order upon reading out the offset signals from the detecting elements 312 of the detecting portions 302. With this, even in a case in which the imaging operation is repeated at short intervals, it becomes easy to read out the offset signals from the detecting elements 312 of the detecting portions 302 arranged in different regions during the imaging operation. Accordingly, it is possible to correct, with high accuracy, the influence of an environmental change or the like in all the detecting portions 302, so that the radiation imaging apparatus 200 capable of performing AEC imaging with high accuracy can be implemented.

Figure 11:
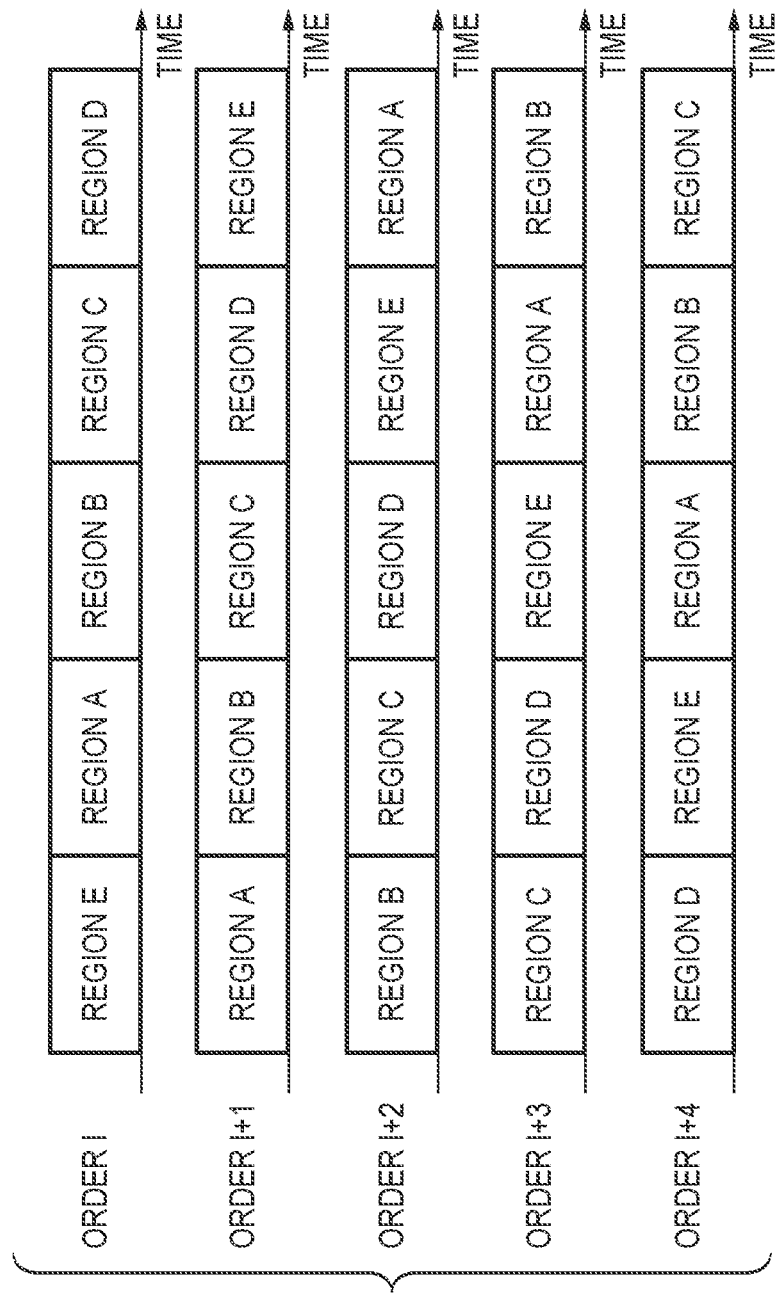
FIG. 11 is a view showing still another example of the offset signal readout order of the radiation imaging apparatus according to the embodiment.

FIG. 11 is a view showing an example of cyclically changing the order of reading out the offset signals. In step S103, the controller 204 first performs the operation of reading out the offset signals from the detecting portions 302 in the order I shown in FIG. 11. Then, after reading out the offset signals from each of the plurality of detecting portions 302, the controller 204 performs the operation of reading out the offset signals from the detecting portions 302 in the order I+1 shown in FIG. 11. Further, after reading out the offset signals from each of the plurality of detecting portions 302 in the order I+1, the controller 204 performs the operation of reading out the offset signals from the detecting portions 302 in the order I+2 shown in FIG. 11. Subsequently, the operation of reading out the offset signals from the detecting portions 302 is performed in the order I+3 and the order I+4, and then the operation of reading out the offset signals from the detecting portions 302 is performed again in the order I.

In this manner, the order of the region A, the region B, the region C, the region D, and the region E for reading out the offset signals determined in step S102 is unchanged, but the order is cyclically changed each time the offset signals are read out from each of the plurality of detecting portions 302. In this case, as shown in FIG. 11, the priority of the detecting portion 302 which is given the highest priority for readout of the offset signal in the order I may be changed to the lowest priority in the order I+1. More specifically, assume a first operation of reading out the offset signals from each of the plurality of detecting portions 302, and a second operation of reading out the offset signals from each of the plurality of detecting portions 302 after the first operation. In this case, in the second operation, the order of reading out the offset signals is changed such that, among the plurality of detecting portions 302, the offset signal is finally read out from the detecting portion from which the offset signals was first read out in the first operation. With this, even in a short period, it is easy to read out the offset signals from all the detecting portions 302.

The timing of transitioning from the order I to the order I+1 may be the timing of reading out the offset signals once from each of the plurality of detecting portions 302, or may be the timing of reading out the offset signals twice or more from each of the plurality of detecting portions 302. Not only in step S103 but also in the processing in steps S106 and S109, the order of reading out the offset signals may be cyclically changed.

By cyclically changing the order of reading out the offset signals, for example, even in a case in which imaging is repeated in which a radiation irradiation request signal is input during obtainment of the offset signal data, it becomes easy to read out the offset signals from all the detecting portions 302. As a result, the influence of an environmental change or the like is suppressed, so that the radiation imaging apparatus 200 capable of performing AEC imaging with high accuracy can be implemented.

The radiation imaging apparatus 200 may further include a method designation unit for the operator designating the above-described various methods of changing the order of reading out the offset signals by the controller 204. For example, the setting unit 203 may have a function of the method designation unit for the operator selecting the method of changing the order of reading out the offset signals. The controller 204 changes the order of reading out the offset signals as described above in accordance with the method input in the method designation unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016886, filed Feb. 4, 2021, which is hereby incorporated by reference herein in its entirety.

What is claimed is:

1. A radiation imaging apparatus, comprising:
   an imaging region comprising a plurality of conversion elements configured to perform an imaging operation of obtaining a radiation image corresponding to incident radiation;
   a plurality of detecting portions, each detecting portion comprising a detecting element configured to detect a radiation dose entering the imaging region; and
   a controller, wherein the controller is configured to
   perform, before the imaging operation, an offset readout operation of reading out offset signals of the detecting elements from the plurality of detecting portions in a state in which irradiation with radiation is not performed,
   detect, in the imaging operation, the radiation dose entering the imaging region using signals output from the detecting elements during irradiation with radiation and the offset signals, and
   be capable of changing, during a period of the offset readout operation, an order of reading out the offset signals from the plurality of detecting portions.

2. The apparatus according to claim 1, wherein the controller is configured to be capable of changing, during the period of the offset readout operation, the order of reading out the offset signals from the plurality of detecting portions in accordance with an imaging condition in the imaging operation.

3. The apparatus according to claim 2, wherein the controller is configured to start readout of the offset signals in a predetermined order in accordance with a start of the offset readout operation and, if the imaging condition is set, is configured to change the order of reading out the offset signals in accordance with the set imaging condition.

4. The apparatus according to claim 3, wherein after the imaging condition is set, if the detecting portion used for detecting the radiation dose in the imaging operation is designated among the plurality of detecting portions, the controller is configured to read out the offset signals from the designated detecting portion among the plurality of detecting portions.

5. The apparatus according to claim 3, wherein the predetermined order is determined according to distances between the plurality of detecting portions and a center of the imaging region.

6. The apparatus according to claim 2, wherein the imaging condition includes at least one of an imaging part, a target dose, an irradiation condition to be set in a radiation generation apparatus to irradiate the radiation imaging apparatus with radiation, and information specifying an imaging procedure.

7. The apparatus according to claim 2, wherein the imaging condition includes information as to whether the radiation imaging apparatus is placed in a fluoroscopic table.

8. The apparatus according to claim 7, wherein if the apparatus is placed in the fluoroscopic table, the imaging condition further includes information of a posture of the fluoroscopic table.

9. The apparatus according to claim 1, wherein the controller has a function of storing a frequency of designation as the detecting portion used to detect of the radiation dose in the imaging operation among the plurality of detecting portions, and
the controller is configured to change the order of reading out the offset signals in accordance with the frequency.

10. The apparatus according to claim 9, wherein the controller is configured to read out the offset signals in the order from the detecting portion having a highest frequency among the plurality of detecting portions.

11. The apparatus according to claim 1, further comprising a detector configured to detect an orientation of the imaging region with respect to a vertical direction, wherein
the controller is configured to change the order of reading out the offset signals in accordance with the orientation.

12. The apparatus according to claim 1, wherein the offset readout operation includes a first operation of reading out the offset signals from each of the plurality of detecting portions, and a second operation of reading out the offset signals from each of the plurality of detecting portions after the first operation, and
the controller is configured to cyclically change the order of reading out the offset signals, between the first operation and the second operation.

13. The apparatus according to claim 12, wherein the controller is configured to change the order of reading out the offset signals such that in the second operation the offset signal is finally read out from the detecting portion from which the offset signal was first read out in the first operation.

14. The apparatus according to claim 1, wherein the controller further includes a method designation unit configured to designate a method of changing the order of reading out the offset signals, and
the controller is configured to change the order of reading out the offset signals in accordance with the method input in the method designation unit.

15. The apparatus according to claim 1, wherein the detecting element includes a first element and a second element having sensitivities different from each other, and
the controller is configured to detect the radiation dose entering the imaging region using signals output from the first element and the second element.

16. The apparatus according to claim 1, wherein the controller is configured to read out the offset signals from at least two detecting portions in parallel among the plurality of detecting portions.

17. A radiation imaging system, comprising:
the radiation imaging apparatus according to claim 1; and
a radiation generation apparatus configured to irradiate the radiation imaging apparatus with radiation.

18. A radiation imaging apparatus, comprising:
an imaging region comprising a plurality of conversion elements configured to perform an imaging operation of obtaining a radiation image corresponding to incident radiation;
a plurality of detecting portions, each detecting portion comprising a detecting element configured to detect a radiation dose entering the imaging region; and
a controller configured to perform, before the imaging operation, an offset readout operation of reading out offset signals of the detecting elements from the plurality of detecting portions in a state in which irradiation with radiation is not performed, and (ii) detect, in the imaging operation, the radiation dose entering the imaging region using signals output from the detecting elements during irradiation with radiation and the offset signals, wherein
the offset readout operation is performed in an order according to distances between the plurality of detecting portions and a center of the imaging region.

* * * * *